(12) United States Patent
Porjo

(10) Patent No.: US 7,543,996 B1
(45) Date of Patent: Jun. 9, 2009

(54) CALIBRATION

(75) Inventor: Niko Santeri Porjo, Piikkiö (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/999,863

(22) Filed: Dec. 7, 2007

(51) Int. Cl.
G02B 6/42 (2006.01)
G02B 6/43 (2006.01)

(52) U.S. Cl. .......................................... 385/92; 385/89
(58) Field of Classification Search ................ None
See application file for complete search history.

(56) References Cited

U.S. PATENT DOCUMENTS

| 4,792,824 | A | | 12/1988 | Kozuka | 355/3 BE |
|---|---|---|---|---|---|
| 5,080,462 | A | * | 1/1992 | Goto | 385/122 |
| 5,175,780 | A | * | 12/1992 | Sano et al. | 385/47 |
| 5,917,667 | A | * | 6/1999 | Turner | 359/880 |
| 6,074,290 | A | | 6/2000 | Ko et al. | 451/390 |
| 6,384,916 | B1 | | 5/2002 | Furtak | 356/369 |
| 6,701,038 | B2 | * | 3/2004 | Rensing et al. | 385/18 |
| 7,204,647 | B2 | * | 4/2007 | Ohm | 385/92 |

* cited by examiner

Primary Examiner—Omar Rojas
(74) Attorney, Agent, or Firm—Harrington & Smith PC

(57) ABSTRACT

A system, including an optical source configured to emit optical signals, and an optical receiver configured to receive optical signals; a housing having one or more optical windows; a user-detachable reflector attached to the housing, configured to enable emitted optical signals exiting an optical window to be reflected, so that the optical signals re-enter the housing via an optical window for reception by the optical receiver; and a calibrator configured to calibrate an output of the optical receiver using optical signals received by the optical receiver.

25 Claims, 5 Drawing Sheets

CALIBRATION

FIELD OF THE INVENTION

Embodiments of the present invention relate to calibration. In particular, they relate to calibration of an optical receiver.

BACKGROUND TO THE INVENTION

An apparatus for detecting the color of an object may comprise an optical source and an optical receiver. The color of an object may be sensed by detecting at the optical receiver light emanating from the object. The color of the object may be, for example, determined by the interpreting the different outputs from respective red, green and blue color sub-receivers as different intensities. Calibration data is required for this interpretation.

Calibration may be achieved by using the optical source to illuminate an object of known color and processing the outputs from the respective red, green and blue color sub-receivers.

BRIEF DESCRIPTION OF VARIOUS EMBODIMENTS OF THE INVENTION

According to various embodiments of the invention, there is provided a system, comprising: an optical source configured to emit optical signals; an optical receiver configured to receive optical signals; a housing having one or more optical windows; a user-detachable reflector attached to the housing, configured to enable emitted optical signals exiting an optical window to be reflected, so that the optical signals re-enter the housing via an optical window for reception by the optical receiver; and a calibrator configured to calibrate an output of the optical receiver using optical signals received by the optical receiver.

According to various embodiments of the invention, there is provided a system, comprising: means for emitting optical signals; means for receiving optical signals; housing means having one or more optical windows; user-detachable reflecting means attached to the housing means, for enabling emitted optical signals exiting an optical window to be reflected, so that the optical signals re-enter the housing means via an optical window for reception by the means for receiving; and means for determining calibration data using optical signals received by the means for receiving.

According to various embodiments of the invention, there is provided a method, comprising: emitting an optical signal so that it exits a housing via an optical window; reflecting the emitted optical signal using a user-detachable reflector, so that the reflected optical signal re-enters the housing via an optical window; receiving the reflected optical signal at an optical receiver; and calibrating an output of the optical receiver using the received optical signal.

According to various embodiments of the invention, there is provided a method, comprising: attaching a user-detachable reflector to a housing having one or more optical windows, so as to enable the user-detachable reflector to reflect optical signals exiting an optical window such that reflected optical signals re-enter the housing via an optical window, for reception by an optical receiver.

According to various embodiments of the invention, there is provided a user-detachable reflector, comprising: a reflective surface configured to reflect optical signals; an adhesive for removably attaching the user-detachable reflector to a medium, such that the reflective surface of the user-detachable reflector faces the medium; and a support for controlling a shape of the reflective surface.

According to various embodiments of the invention, there is provided a user-detachable reflector, comprising: a reflective surface configured to reflect optical signals; attachment means for removably attaching the user-detachable reflector to a medium, such that the reflective surface of the user-detachable reflector faces the medium; and a support for controlling a shape of the reflective surface.

According to various embodiments of the invention, there is provided an apparatus, comprising: an optical source configured to emit optical signals, an optical receiver configured to receive optical signals; an optical guide having a first guide portion and a second, different, guide portion spaced from the first guide portion, the first guide portion being configured to guide emitted optical signals towards an exterior of the apparatus, the second guide portion being configured to guide optical signals from the exterior of the apparatus towards the optical receiver; and a calibrator configured to calibrate the output by the optical receiver using optical signals received by the optical receiver.

According to various embodiments of the invention, there is provided an optical guide for an apparatus, comprising: a first guide portion configured to guide optical signals towards a reflector at the exterior of the optical guide; and a second guide portion, separate from the first guide portion, configured to guide optical signals reflected by the reflector towards an optical receiver.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 1:
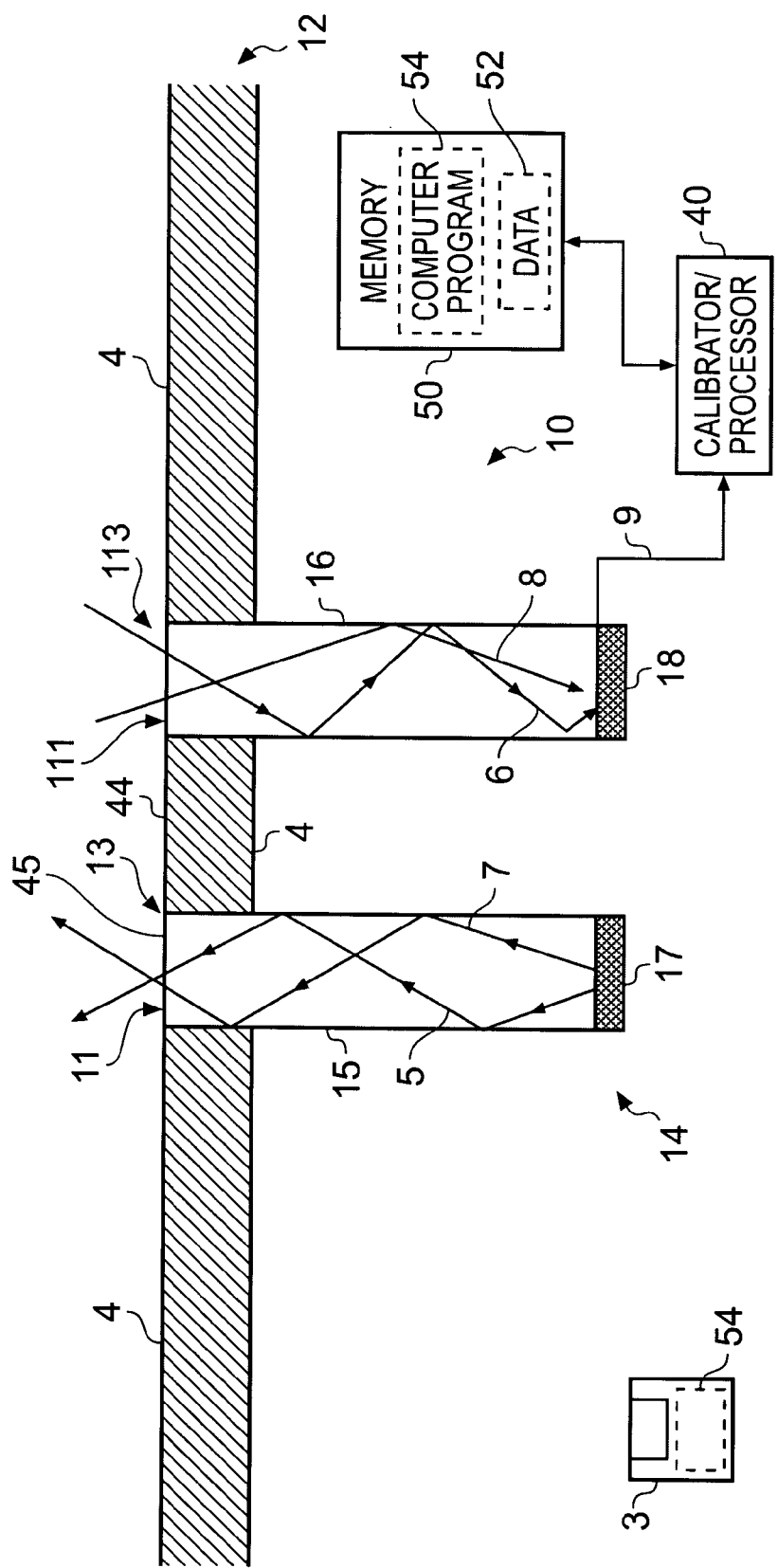
FIG. 1 illustrates an apparatus.

The Figures illustrate a system 100, comprising: an optical source 17 configured to emit optical signals; an optical receiver 18 configured to receive optical signals; a housing 12 having one or more optical windows 11, 111; a user-detachable reflector 20 attached to the housing 12 configured to enable emitted optical signals exiting an optical window 11 to be reflected, so that the optical signals re-enter the housing 12 via an optical window 111 for reception by the optical receiver 18; and a calibrator 40 configured to calibrate an output 9 of the optical receiver 18 using optical signals received by the optical receiver 18.

FIG. 1 illustrates an apparatus 10. The apparatus 10 may, for example, be a portable electronic apparatus such as a mobile radiotelephone, a personal digital assistant, a personal music player, etc. The apparatus 10 comprises a housing 12, an optical guide 14, an optical source 17, an optical receiver

18, a calibrator/processor 40 and a memory 50. The memory 50 is configured to store computer program instructions 54 and data 52.

The computer program instructions 54 control the operation of the apparatus 10 when loaded into the processor 40. The computer program instructions 54 provide the logic and routines that enables the apparatus to perform aspects of the method illustrated in FIG. 3.

The computer program instructions 54 may arrive at the apparatus 10 via an electromagnetic carrier signal or be copied from a physical entity 3 such as a computer program product, a memory device or a record medium such as a CD-ROM or DVD. The apparatus 10 may propagate or transmit the computer program as a computer data signal.

In an alternative implementation, the processor 40 and/or the optical source 17 and/or the optical receiver 18 and/or the memory 50 may be provided by an application specific integrated circuit.

In FIG. 1, a cross section of the housing 12 and the optical guide 14 is illustrated. The housing 12 shown in FIG. 1 includes first 13 and second 113 apertures that provide first 11 and second optical windows 111. The optical windows 11, 111 in the housing 12 enable optical signals emitted from the interior of the housing 12 to exit the housing 12, and enable optical signals emanating from the exterior of the housing 12 to enter the interior of the housing 12. The reference numeral 4 indicates opaque portions of the housing 12.

The optical guide 14 comprises a first guide portion 15 and a second guide portion 16, spaced from and separate to the first guide portion 15. A part of the first guide portion 15 is contained in the first aperture 13 and forms part of the first optical window 11. A part of the second guide portion 16 is contained in the second aperture 113 and forms part of the second optical window 111. In some embodiments of the invention, the first guide portion 15 may be an optical fiber and/or the second guide portion 16 may be an optical fiber.

While in FIG. 1 the apparatus 10 includes two optical windows 11, 111 separated by an opaque portion of the housing 12, in an alternative implementation it may be that an opaque portion of the housing 12 does not separate the first and second guide portions 15, 16 of the optical guide 14, meaning that only a single aperture in the housing is provided for a single optical window. In another implementation, the optical guide 14 may be set back from one or more apertures in the opaque portion of the housing 12, such that parts of the optical guide 14 do not form part of one or more optical windows. In such an implementation, the one or more apertures would provide one or more optical windows, and may or may not be filled with a transparent or translucent material.

The optical source 17 and the optical receiver 18 may form part of an optical sensor. The optical source 17 is configured to emit optical signals and the optical receiver 18 is configured to receive optical signals. The optical source 17 may, for example, be a light emitting diode. The light emitting diode may emit optical signals having a wavelength corresponding to that of visible light.

The optical receiver 18 may be a multi-channel optical receiver that includes a plurality of optical (sub) receivers, each of which is dedicated to a different wavelength spectrum or channel. Reference to an optical receiver 18 may be a reference to one or more of a single channel optical receiver, a multi-channel optical receiver and a sub-receiver of a multi-channel optical receiver. An optical receiver 18 may be configurable so that it receives one or more channels and the bandwidth of the channel(s) may also be controlled.

In one example, an optical receiver 18 may comprise three photodiodes: one for receiving red light, one for receiving green light and one for receiving blue light.

In the example illustrated in FIG. 1, the optical source 17 is located in the housing 12 beneath the first optical window 11. The optical receiver 18 is located in the housing 12 beneath the second optical window 111.

The first guide portion 15 of the optical guide 14 is configured to guide optical signals that have been emitted by the optical source 17 out of the housing 12. For example, the optical source 17 may emit optical signals in a number of different directions. FIG. 1 illustrates the optical source 17 emitting two optical signals 5, 7 (depicted as rays) in different directions. The first portion 15 of the optical guide 14 is configured so that optical signals emitted by the optical source 17 undergo total internal reflection within the first guide portion 15 and exit the apparatus 10 via the optical window 11.

The second guide portion 16 of the optical guide 14 is configured so that optical signals entering the housing 12 via the second optical window 111 may undergo total internal reflection within the second guide portion 16, before arriving at the optical receiver 18. FIG. 1 illustrates two optical signals 6, 8 being reflected within the second guide portion 16 and arriving at the optical receiver 18.

The optical receiver 18 may be used to sense properties of objects that are external to the apparatus 10. For example, the optical receiver 18 may be used to sense the color of an object, or the proximity of an object.

For instance, in order to sense the color of an object, light emanating from the object is received by the optical receiver 18. As mentioned above, the optical receiver 18 may comprise a plurality of sub-receivers. For example, it may comprise three sub-receivers: one for receiving red light, one for receiving blue light and one for receiving green light. Each sub-receiver converts incident light into an electrical output. The electrical output that is provided by each sub-receiver is dependent upon the amount of light that it receives. FIG. 1 illustrates the electrical output from each sub-receiver being provided to the processor 40 as an output 9.

The processor 40 is configured to determine the intensity of light that has been received in one or more channels of the optical receiver 18, by interpreting the input 9 provided by the optical receiver 18 and associating it with one or more intensities. In the case of an optical receiver having red, green and blue sub-receivers, the processor 40 determines how much red, green and blue light was received by the optical receiver 18 by evaluating the outputs provided by the red, green and blue sub-receivers and associating each of the outputs with an intensity. It then converts those intensities into a color value. This information may then be conveyed to the user.

In some circumstances, such as in dark conditions, the optical emitter 17 may emit an optical signal towards the object. The object then reflects the emitted optical signal back into the second optical window 111, such that the reflected optical signal is received by the optical receiver 18.

It may be that each optical receiver 18 produced during manufacturing is not the same, meaning that different optical receivers may provide different outputs in response to receiving a given optical signal.

One way be remedying this might be to remove, as far as is possible, the differences between each manufactured optical receiver. However, this may result in a substantial increase in manufacturing costs. Instead, the inaccuracies can instead be reduced by calibrating the optical receiver 18 in an apparatus 10.

Figure 2:
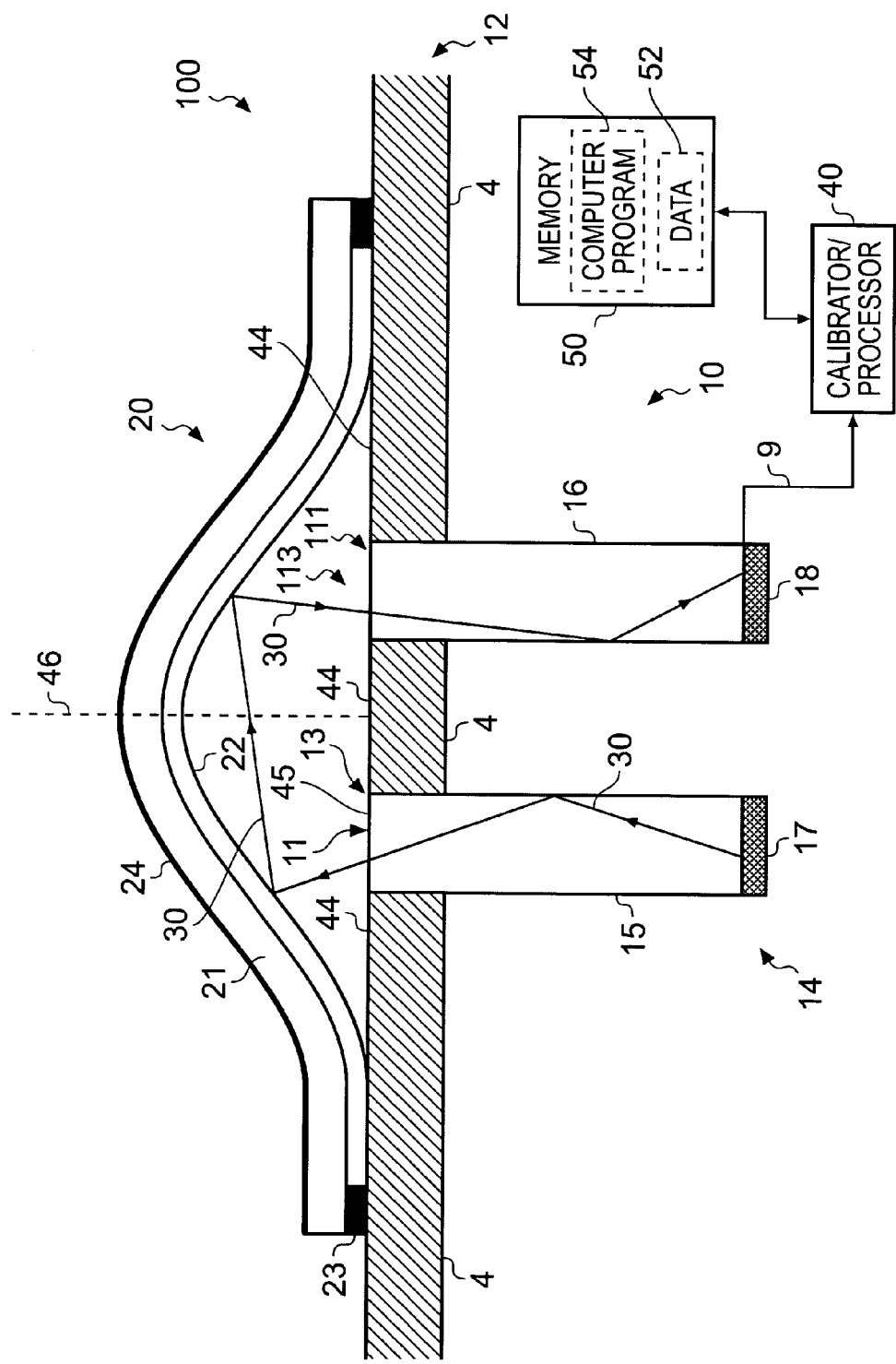
FIG. 2 illustrates a user-detachable reflector attached to a housing of an apparatus.

FIG. 2 illustrates a system 100 including a user-detachable reflector 20 and an apparatus 10. The apparatus 10 illustrated in FIG. 2 takes the same form as the apparatus 10 described in FIG. 1. The user-detachable reflector 20 comprises an adhesive 23, a reflective surface 22, a support 21 and an opaque surface 24.

The adhesive 23 removably attaches the user-detachable reflector 20 to the housing 12 and is on the same side of the user-attachable reflector 20 as the reflective surface 22. The properties of the adhesive 23 are such that it may be easily removed by a user, and does not cause any permanent marking to the housing 12. The adhesive 23 is illustrated in FIG. 2 as attaching the user-detachable reflector 20 to an opaque portion 4 of the housing 12. In an alternative implementation, the adhesive may attach the user-detachable reflector 20 directly to one or more of the optical windows 11, 111.

The reflective surface 22 is an interior surface which faces the exterior of the housing 12. It is configured to reflect optical signals that are emitted by the optical source 17 and exit the housing 12 via the first optical window 11. The reflective surface 22 is a surface that reflects light. It could be, but need not be, a mirror surface. In alternative embodiments, the reflective surface 22 could be a white surface.

The reflective surface may be a diffuse surface (i.e. a surface providing diffuse reflection) or a specular surface (i.e. a surface providing specular reflection). One example of a diffuse surface that may be used is a Lambertian surface.

In some embodiments of the invention, the interface of the housing 12 and the user-detachable reflector 20 (other than that forming the entrance to the second guide portion 16) may be configured to reflect some of the optical signals that are incident upon it. In the example illustrated in FIG. 2, the upper surface 45 of the first optical window 11, and the upper surface 44 of the housing 12 lying underneath the cavity separating the housing 12 from the reflector 20, could be reflective. This enables such optical signals to be continuously reflected until they are directed towards second guide portion 16 of the optical guide 14.

The reflective surface 22 of the user-detachable reflector 20 has a generally arcuate convex cross sectional shape that bows away from the housing 12, enabling it to reflect optical signals emanating from the first guide portion 15 of the optical guide 14 into the second guide portion 16 of the optical guide 14.

The shape of the reflective surface 22 may be such that it has a line of symmetry 46 that is perpendicular to the plane of the housing surface. The line of symmetry 46 is halfway between where optical signals exit the housing 12 at the first optical window 11, and where optical signals re-enter the housing 12 at the second optical window 111.

The user-detachable reflector 20 has a relatively low profile above the first and second optical windows 11, 111, in that its height (i.e. the distance above the first and second optical windows 11, 111) is much smaller than its width. For example, in some embodiments, the height may be approximately one-fifth of the length. In other embodiments, the height may be approximately one-tenth of the length.

The support 21 controls the shape of the user-detachable reflector 20 (and therefore also that of the reflective surface 22), so that the shape of the user-detachable reflector 20 is maintained following its attachment to the housing 12.

The opaque surface 24 on the exterior of the support 21 may or may not be part of the support 21. The opaque surface 24 prevents any ambient optical signals (e.g. ambient light) from entering the housing via the optical windows 11, 111.

The user-detachable reflector 20 may also be configured to prevent one or more of the optical windows 11, 111 from damage. For example, the user-detachable reflector 20 may provide protection against scratching or cracking.

Figure 3:
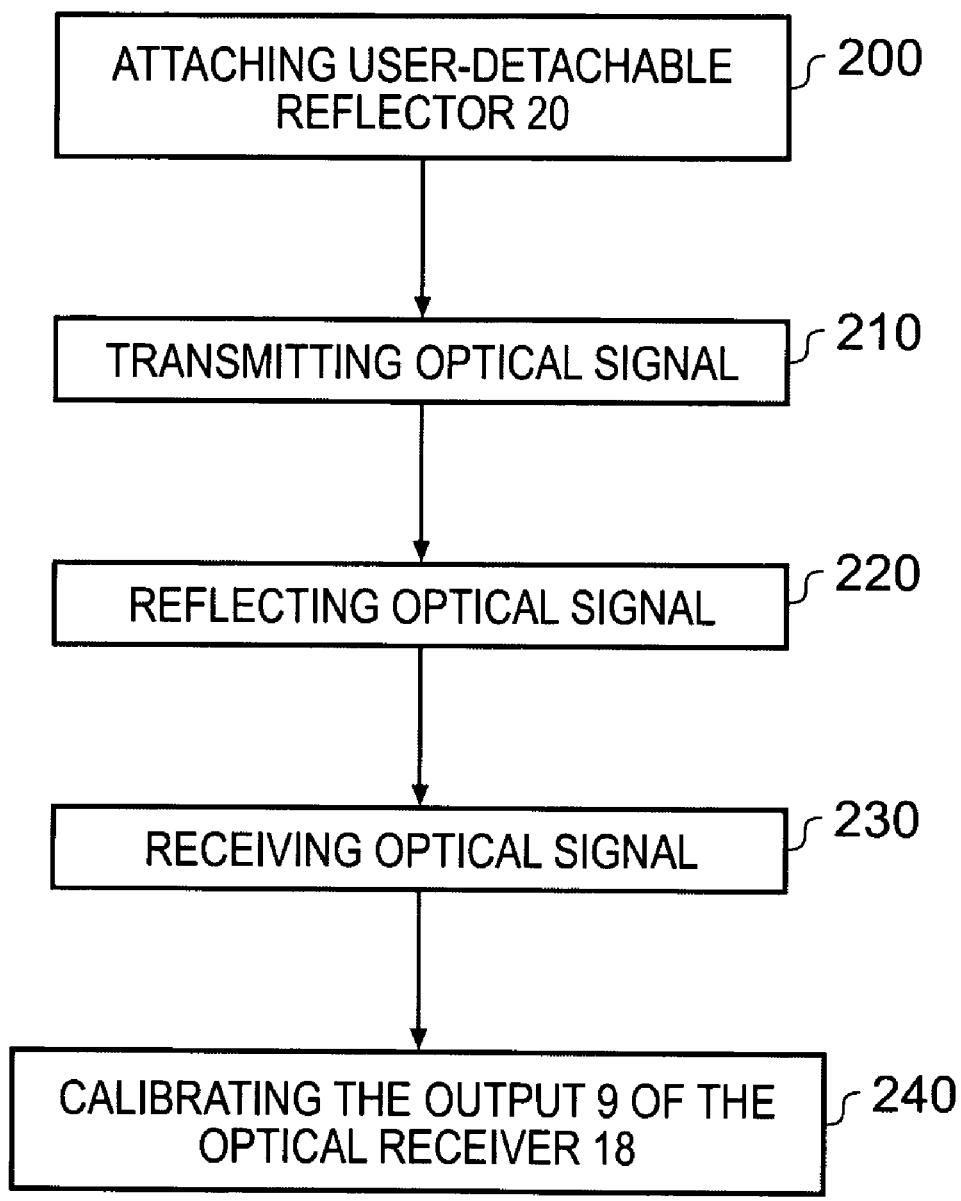
FIG. 3 illustrates a method of calibrating the output of an optical receiver.

FIG. 3 is a block diagram of a method. At block 200, the user-detachable reflector 20 is attached to the housing 12 using an adhesive 23. The user-detachable reflector 20 may, for example, be attached during the manufacturing of the apparatus 10, or after the manufacture of the apparatus 10.

At block 210, the optical source 17 emits an optical signal 30, beginning a calibration process. The calibration process may be performed by the manufacturer of the apparatus 10, or may alternatively be performed by a user. For example, the calibration process may be performed when a user switches on the apparatus 10 for the first time.

The optical signal 30 is guided through the first optical window 11 by the first portion 15 of the optical guide 14 and exits the housing 12 of the apparatus 10.

At block 220, the emitted optical signal 30 is reflected by the (interior) reflective surface 22. In the example illustrated in FIG. 2, the emitted optical signal 30 is reflected twice by the reflective surface 22. A first portion of the reflective surface 22 reflects the emitted optical signal 30 towards a second portion of the reflective surface. The second portion of the reflective surface further reflects the emitted optical signal 30, directing it towards the second portion 16 of the optical guide 14. The second portion 16 of the optical guide 14 then guides emitted optical signal 30 towards the optical receiver 18.

It will be appreciated by the person skilled in the art that some optical signals may take optical paths that are different to the optical path illustrated in FIG. 2 in relation to the optical signal 30, in particular where the reflective surface 22 is configured to provide diffuse reflection.

At block 230, the optical receiver 18 receives the emitted optical signal 30 and converts it into electrical signals. It then provides the electrical signals as an input 9 to the processor 40.

At block 240, the output 9 of the optical receiver 18 is calibrated.

The intensity that is expected to be received in each of the one or more channels of the optical receiver 18 is known and stored in the memory as data 52 (for example, where the optical receiver 18 includes red, green and blue sub-receivers, the relative intensity of the red, green and blue light that is expected to be received at the optical receiver 18 is known). The relative intensity of the optical signals that are received at the optical receiver 18 is dependent upon the reflectance spectrum of the reflective surface 22.

As the relative intensity that is expected to be received in each of the one or more channels of the optical receiver 18 is known, the processor 40 is able to use the measured intensities to generate the calibration data 52 for calibrating the optical receiver 18.

The calibration data 52 may then be used to interpret further optical signals that are received by the optical receiver 18. For example, where the optical receiver 18 is for detecting color, the processor 40 may use the calibration data 52 to determine the how much red, green and blue light is reflected (or emitted) by objects external to the apparatus 10, enabling the processor 40 to determine the color hue of the external object.

In some embodiments of the invention, the reflectance spectrum of the reflective surface 22 may be configured to change the wavelength of at least a portion of a emitted optical signal, upon reflectance of the emitted optical signal. For example, an optical signal emitted by the optical source 17 may comprise visible light which in turn includes red, green and blue light. The optical receiver 18 may be able to receive optical signals having a wavelength in the visible light wavelength range and optical signals having a wavelength in the infrared wavelength range. In order to calibrate both the visible light aspect of the optical receiver 18 and the infrared aspect of the optical receiver 18, the reflective surface may, for instance, convert some or all of incident blue light to a reflected infrared signal. This could be achieved by, for example, adding a controlled amount of phosphor to the paint used to create the reflective surface 22.

Thus, advantageously, both the visible light aspect and the infrared aspect of the optical receiver 18 may be calibrated, even though the optical source 17 is not configured to emit optical signals in the infrared wavelength range.

Figure 4:
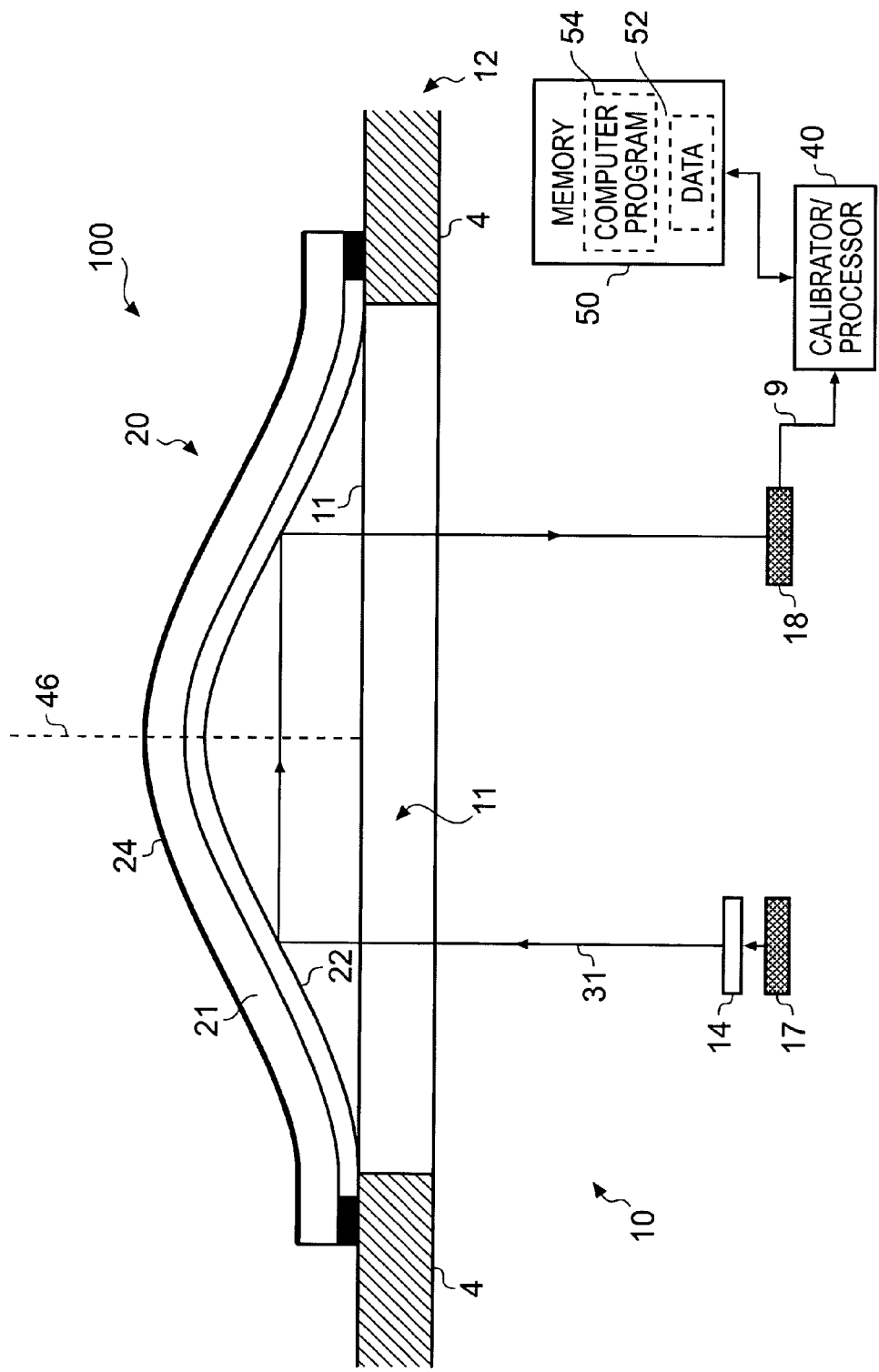
FIG. 4 illustrates a substantially collimated optical signal being reflected by a user-detachable reflector.

In the description given above, the optical guide 14 was described as employing total internal reflection to guide emitted optical signals towards the user-detachable reflector 20. In the example illustrated in FIG. 4, the optical guide 14 takes the form of a lens or lens system. The optical guide 14 collimates the optical signals emitted by the optical source 17 and directs them through an optical window 11 and towards the user-detachable reflector 20. A first portion of the reflective surface 22 of the user-detachable reflector 20 reflects a collimated optical signal 31 towards a second portion of the reflective surface 22. The second portion of the reflective surface 22 reflects the optical signal 31 through the optical window 11 and towards the optical receiver 18. The processor 40 calibrates the output 9 of the optical receiver 18 in the same manner as that previously described.

Figure 5:
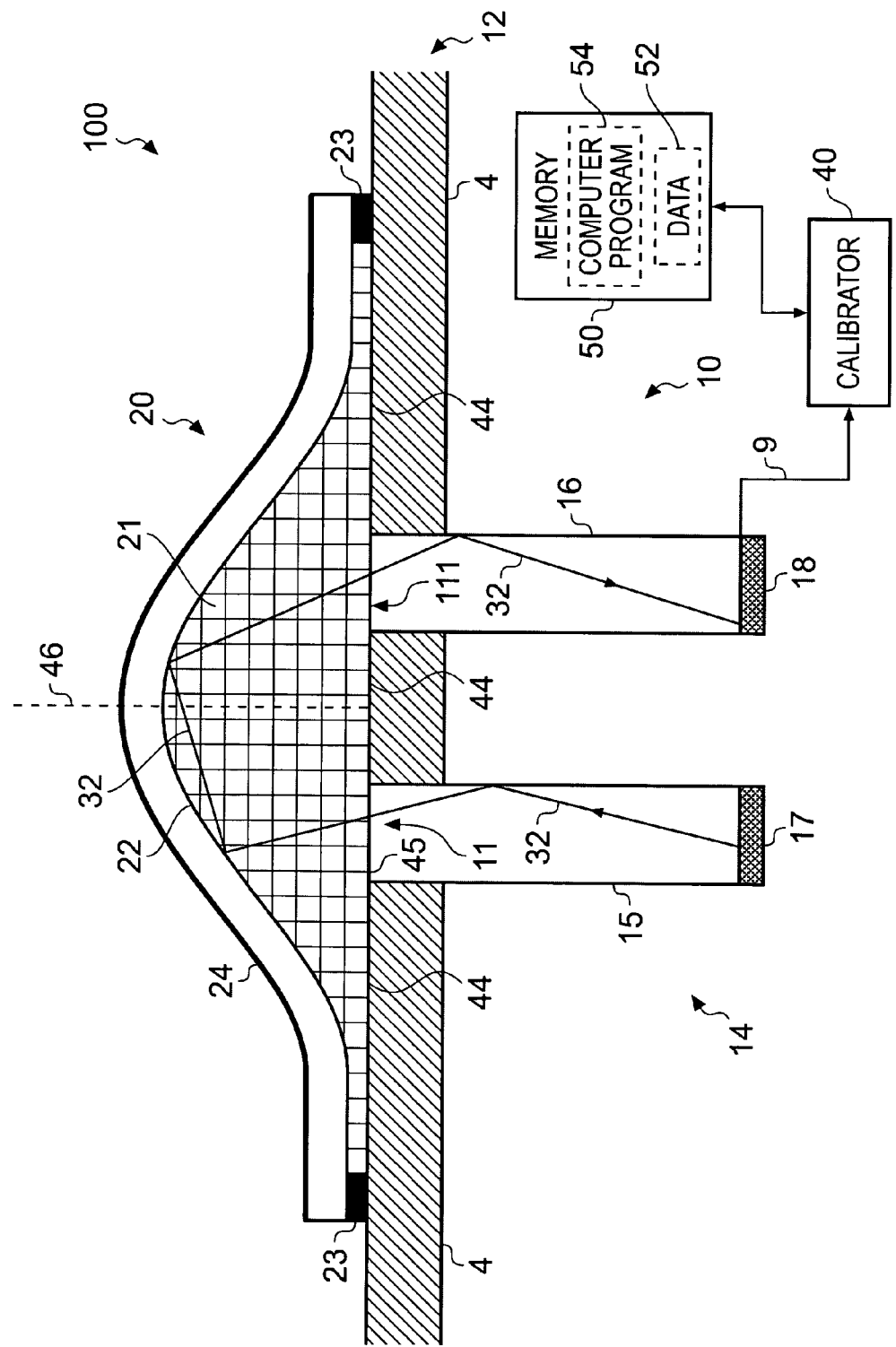
FIG. 5 illustrates a user-detachable reflector attached to a housing of an apparatus, the user-detachable reflector having a support located between its reflective surface and the apparatus.

FIG. 5 illustrates a further embodiment of the invention in which the support 21 for controlling the shape of the reflective surface 22 is situated between the reflective surface 22 and the optical window 11. In this example, optical signals that are emitted by the optical source 17 travel through the support 21. FIG. 5 depicts the path of an optical signal 32 from the optical source 17 to the optical receiver 18. The support 21 may refract the optical signals as they travel through it. However, provided that the support 21 is not too dispersive, the relative intensities of the optical signals being received at the optical receiver 18 will be relatively unchanged, meaning that the output 9 of the optical receiver 18 may be calibrated in the same manner as that described above in relation to FIG. 3.

In FIG. 5, an adhesive 23 adheres the user-detachable reflector 20 to opaque parts 4 of the housing 12. However, alternatively, it may be that the adhesive 23 adheres the user-attachable reflector 20 directly to one or more of the optical windows 11, 111.

FIG. 5 illustrates a similar optical guide 14 to that illustrated in FIG. 3. It will be appreciated by those skilled in the art that the lens or lens system described in relation to FIG. 4 could also be used in the FIG. 5 example.

In the above paragraphs, a system and a method for calibrating an optical receiver has been described. The described system and method are advantageous because calibration of the optical receiver 18 may, for example, take place after production of the apparatus 10. For example, the calibration process could take place when the apparatus 10 is switched on for the first time by a user. This enables a calibration process to take place, without requiring that it is carried out by the manufacturer, reducing the burden on the manufacturer and potentially reducing manufacturing costs.

Some of the blocks illustrated in the Figs may represent steps in a method and/or sections of code in the computer program 54. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed. For example, the form of the optical guide 14 need not be precisely the same as that shown to achieve the effects mentioned above. Some parts 4 of the housing 12 have been mentioned as being opaque in the description above. However, in alternative implementations, these parts 4 of the housing 12 could be transparent or translucent if appropriate steps to ensure that the operation of the optical source 17 and the optical receiver 18 are not compromised.

References have been made above to optical signals having wavelengths corresponding to red, green and blue visible light and the infrared wavelength range. It will, however, be appreciated that embodiments of the invention could be implemented using optical sources and/or optical receivers that emit and/or receive optical signals having wavelengths other than those mentioned above, such those in the ultraviolet wavelength range.

The user-detachable reflector 20 that has been described above comprises an adhesive 23 for attaching the user-detachable reflector to the housing 12 of the apparatus 10. However, alternative attaching means to adhesive could be used, such as a clip arrangement.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A system, comprising:
an optical source configured to emit optical signals, and an optical receiver configured to receive optical signals;
a housing having one or more optical windows;
a user-detachable reflector attached to the housing, configured to enable emitted optical signals exiting an optical window to be reflected, so that the optical signals re-enter the housing via an optical window for reception by the optical receiver; and wherein the reflector has an interior reflective surface that faces one or more of the optical windows, and an opaque exterior surface configured to prevent ambient optical signals from entering the housing via one or more of the optical windows; and
a calibrator configured to calibrate an output of the optical receiver using optical signals received by the optical receiver.

2. A system as claimed in claim 1, further comprising an optical guide having a first guide portion and a second, different, guide portion, the first guide portion being configured to guide emitted optical signals towards the user-detachable reflector, the second guide portion being configured to guide reflected optical signals towards the optical receiver.

3. A system as claimed in claim 2, wherein the optical guide is configured to guide optical signals using total internal reflection.

4. A system as claimed in claim 1, wherein the user-detachable reflector comprises an adhesive configured to detachably attach the user-detachable reflector to the housing.

5. A system as claimed in claim 1, wherein the reflector comprises a support configured to control the shape of the reflector.

6. A system as claimed in claim 1, wherein a cavity is located between the reflector and one or more of the optical windows.

7. A system as claimed in claim 5, wherein the support is located between the reflector and one or more of the optical windows.

8. A system as claimed in claim 1, wherein the reflector has a symmetrical cross section.

9. A system as claimed in claim 1, wherein the reflector has a generally arcuate cross section.

10. A system as claimed in claim 1, wherein a first portion of the reflector is configured to reflect at least a portion of an optical signal towards a second portion of the reflector, and the second portion of the reflector is configured to reflect the optical signal towards an optical window of the housing for reception by the optical receiver.

11. A system as claimed in claim 1, wherein the calibrator is configured to determine a spectrum of a received optical signal, to compare the determined spectrum with an expected spectrum, and to calibrate the optical receiver in dependence upon the comparison.

12. A system as claimed in claim 1, wherein the reflector is configured to change a wavelength of at least a portion of a emitted optical signal, upon reflection of the emitted optical signal by the reflector, from a first wavelength to a second wavelength.

13. A system as claimed in claim 12, wherein the first wavelength is a visible light wavelength and the second wavelength is an infrared wavelength.

14. A system as claimed in claim 1, wherein the reflector is configured to prevent one or more of the optical windows from being damaged.

15. A system as claimed in claim 1, wherein the housing is a housing of a portable electronic apparatus.

16. A system, comprising:
means for emitting optical signals;
means for receiving optical signals;
housing means having one or more optical windows;
user-detachable reflecting means attached to the housing means, for enabling emitted optical signals exiting an optical window to be reflected, so that the optical signals re-enter the housing means via an optical window for reception by the means for receiving, and wherein the reflector has an interior reflective surface that faces one or more of the optical windows, and an opaque exterior surface configured to prevent ambient optical signals from entering the housing means via one or more of the optical windows; and
means for determining calibration data using optical signals received by the means for receiving.

17. A system as claimed in claim 16, further comprising an optical guide means having a first guide portion and a second, different, guide portion, the first guide portion being configured to guide emitted optical signals towards the user-detachable reflecting means, the second guide portion being configured to guide reflected optical signals towards the means for receiving.

18. A method, comprising:
emitting an optical signal so that it exits a housing via an optical window;
reflecting the emitted optical signal using a user-detachable reflector, so that the reflected optical signal re-enters the housing via an optical window, wherein the reflector has an interior reflective surface that faces one or more optical windows, and an opaque exterior surface that prevents ambient optical signals from entering the housing via one or more of the optical windows;
receiving the reflected optical signal at an optical receiver; and
calibrating an output of the optical receiver using the received optical signal.

19. A method as claimed in claim 18, further comprising guiding the emitted optical signals along a first guide portion of an optical guide, towards the user-detachable reflector, and guiding reflected optical signals along a second guide portion of the optical guide, leading to the optical receiver.

20. A method as claimed in claim 18, wherein the user-detachable reflector changes a wavelength of at least a portion of an emitted optical signal, upon reflection of the emitted optical signal by the reflector, from a first wavelength to a second wavelength.

21. A system, comprising:
an optical source configured to emit optical signals, and an optical receiver configured to receive optical signals;
a housing having one or more optical windows;
a user-detachable reflector attached to the housing, configured to enable emitted optical signals exiting an optical window to be reflected, so that the optical signals re-enter the housing via an optical window for reception by the optical receiver, and the reflector being configured to change a wavelength of at least a portion of an emitted optical signal, upon reflection of the emitted optical signal by the reflector, from a first wavelength to a second wavelength; and
a calibrator configured to calibrate an output of the optical receiver using optical signals received by the optical receiver.

22. A system as claimed in claim 21, wherein the first wavelength is a visible light wavelength and the second wavelength is an infrared wavelength.

23. A method as claimed in claim 20, wherein the first wavelength is a visible light wavelength and the second wavelength is an infrared wavelength.

24. A method, comprising:
emitting an optical signal so that it exits a housing via an optical window;
reflecting the emitted optical signal using a user-detachable reflector, so that the reflected optical signal re-enters the housing via an optical window, and the reflector changes a wavelength of at least a portion of an emitted optical signal, upon reflection of the emitted optical signal by the reflector, from a first wavelength to a second wavelength;
receiving the reflected optical signal at an optical receiver; and
calibrating an output of the optical receiver using the received optical signal.

25. A method as claimed in claim 24, wherein the first wavelength is a visible light wavelength and the second wavelength is an infrared wavelength.

* * * * *